INVENTOR.
THOMAS H. SNETHEN
BY Frank A. Bruer
ATTORNEY

INVENTOR.
THOMAS H. SNETHEN
BY Frank C. Bruer
ATTORNEY

FILING SYSTEM

INVENTOR.
THOMAS H. SNETHEN
BY Frank A. Bower
ATTORNEY 3,088,786

FILING SYSTEM

Thomas H. Snethen, Dewittville, N.Y., assignor to Watson Manufacturing Company, Inc., Jamestown, N.Y., a corporation of New York Filed Feb. 24, 1960, Ser. No. 10,689
6 Claims. (Cl. 312—198)

The invention relates to extensive systems for maintaining and using numerous records subject to different manipulative procedures.

In extensive filing systems composed of numerous small individual records many different clerical and bookkeeping process are performed on the records. One procedure is the maintaining of the individual files in a current status. Another procedure is to check individual records for various purposes such as providing credit information over the telephone and still another procedure is to handle individual files as a group for mass processing. These procedures are performed by different personnel and since two or more file operators may be working on files physically close there is likely to be interference between the operators resulting in loss of working time and in mistakes.

An object of this invention is to relate the records and the work area so that separate filing procedures are carried out without interference.

Another object of the invention is to associate different record handling operations performed at the same time with a minimum of conflict between the processes.

Another object of the invention is to relate files and work areas to a maximum handling of files per operator and to relate a maximum number of operators within the vicinity of files with minimum interference between operators performing different clerical functions relative to the files.

Other and further objects and advantages will be apparent from the following description taken in connection with the drawings in which FIG. 1 is a perspective view of the system of file units and work areas;

Figures 4, 5:
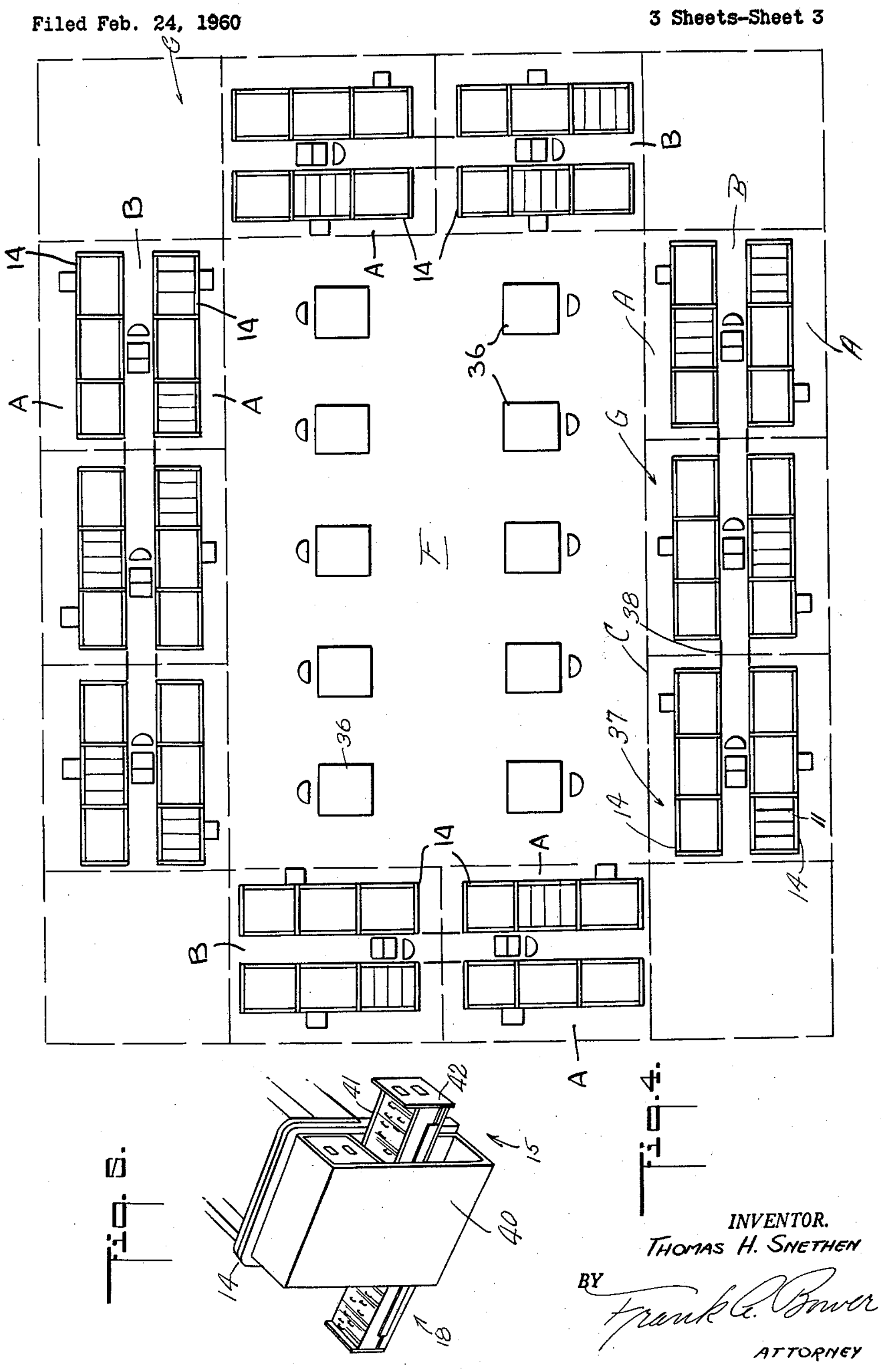

FIG. 4 diagrammatically illustrates a peripheral arrangement of the filing units; and FIG. 5 illustrates a filing cabinet positioned at the end of a row of cabinets.

Referring to the drawings the files or records 10 stand generally vertical in the trays 11 and are divided and indexed by partitions 12 and tabs 13. The tabs extend above the upper edge of the individual file. The trays 11 extend parallel to one another on file cabinets 14. The cabinets are in two parallel rows spaced by a work path 15 so that two rows of trays may be reached from the work path. This combination of two parallel rows of cabinets with files and an intermediate work area forms a unit file. The individual files 10 face the work path and the work path extends a length several times the width of the trays. A unit file operator 16 performs the filing task from the work path by moving up and down the work path and stopping at the particular tray on which a filing operation is to be performed. Thus the unit operator maintains two rows of cabinets. The operator may stand and work between the cabinets. However for continued filing for which the unit file is intended, it is preferable that the operator be mounted on a movable file chair desk 17 as, for instance, disclosed in Pat. No. 2,665,741. The height of the chair and the cabinets are relative so that the files are at approximately desk height in relation to a sitting operator. The operator moves back and forth in the area continuously performing a particular filing function and is permanently associated with a unit grouping of the files.

The length of the work path and the number of trays depend on the activity of the individual records and the time required to make entries. The operator places the files on the moving desk and moves along inserting the records or information. Additional records or information to be filed may be carried to the operator by a messenger or another file clerk. The messenger walks down to the desk and deposits the additional records without interfering with the unit operator who may thus proceed wih the filing in the work path.

There are other operations to be performed in connection with the files than that of entering or changing information. The files are used for reference to answer inquiries as to status of accounts, to determine the nature of the account, to analyze and review the accounts and also to remove entire trays for processing of accounts. These operations are not performed by the unit operator between the files but are performed by other personnel. This latter personnel have intermittent contact with a particular unit since their duties are performed separately from the unit file. Their work stations are located near the unit file and as later described herein they are referred to as area personnel or clerks. The trays are accessible from the aisles 15 and 18 on opposite sides of the cabinets. The trays are removable by a person from the aisles 18. The area clerks may approach, manipulate the files and remove trays without interfering with the unit operator except as to a particular file or tray.

The unit file and the aisles adjacent thereto form a unit filing area. In the unit filing area files are stored, a unit operator maintains the files unmolested and area personnel can approach and consult files without interfering with the unit operator.

As illustrated each unit file has a plurality of trays 11 extending transverse to the cabinets 14. The cabinets may be formed from sheet metal or other suitable material and have vertical end pedestals 20 supporting the horizontal file table 21. The trays are slidably mounted on the file table for removal from the unit. The file table has a horizontal panel 22 on which the trays are set. The file trays are formed as shallow open members 23 with spacers or backers 12 mounted in the member. The backers are pivotally secured to the tray in any suitable manner to swing to either side of the vertical so that the individual files may be easily viewed or handled from either side of the table. The horizontal panel 22 is slightly recessed to form the magazine recess. The inner side of the table has a raised edge or ledge 26 and the outer side has a raised edge or ledge 25 to prevent the sliding of the trays off of the cabinets. The sides **25*a* and 26*a* are slanted for easy insertion and removal of the tray without binding. It also provides an automatic positioning or centering of the tray as inserted. The trays are provided with index tab holders 27 at each end so that the permanent file operator and the area operator are apprised of the contents of the tray. The trays may be indexed on guides inside the trays to be read from either side. The desk 17 of a conventional type is guided on rails 28**. The permanent unit operator has a telephone connected through the cable.

Each unit file is set in a unit filing area C with the with the unit operator performing duties and filing in a center or intermediate work path or aisle B. The cabinets are in the unit filing area on each side of the path. The unit filing area extends exterior to the cabinets to form the aisle or aisle areas A for area personnel to use the files. The permanent unit operator is at the center and the transient area personnel are in the outer or exterior portion of the unit filing area.

The number of cabinets and size of the cabinets depends on the activity of the records. The number is limited to the ability of the unit file operator to handle the filing. The unit files therefore may be formed in separate sets or groups (see FIG. 2). These groups are arranged in a central area C as illustrated with aisles A forming the exterior aisle areas 18 of the unit filing area. The unit filing areas may have overlapping aisle areas since the duties performed are of a transient type. The area personnel are stationed at desks or tables 19 around the central area C in an area E with ready access to any group of units. The aisles extend along the outer side of each unit file so that the peripheral or transient personnel have access to any file without interference with the unit operator.

Figure 1:
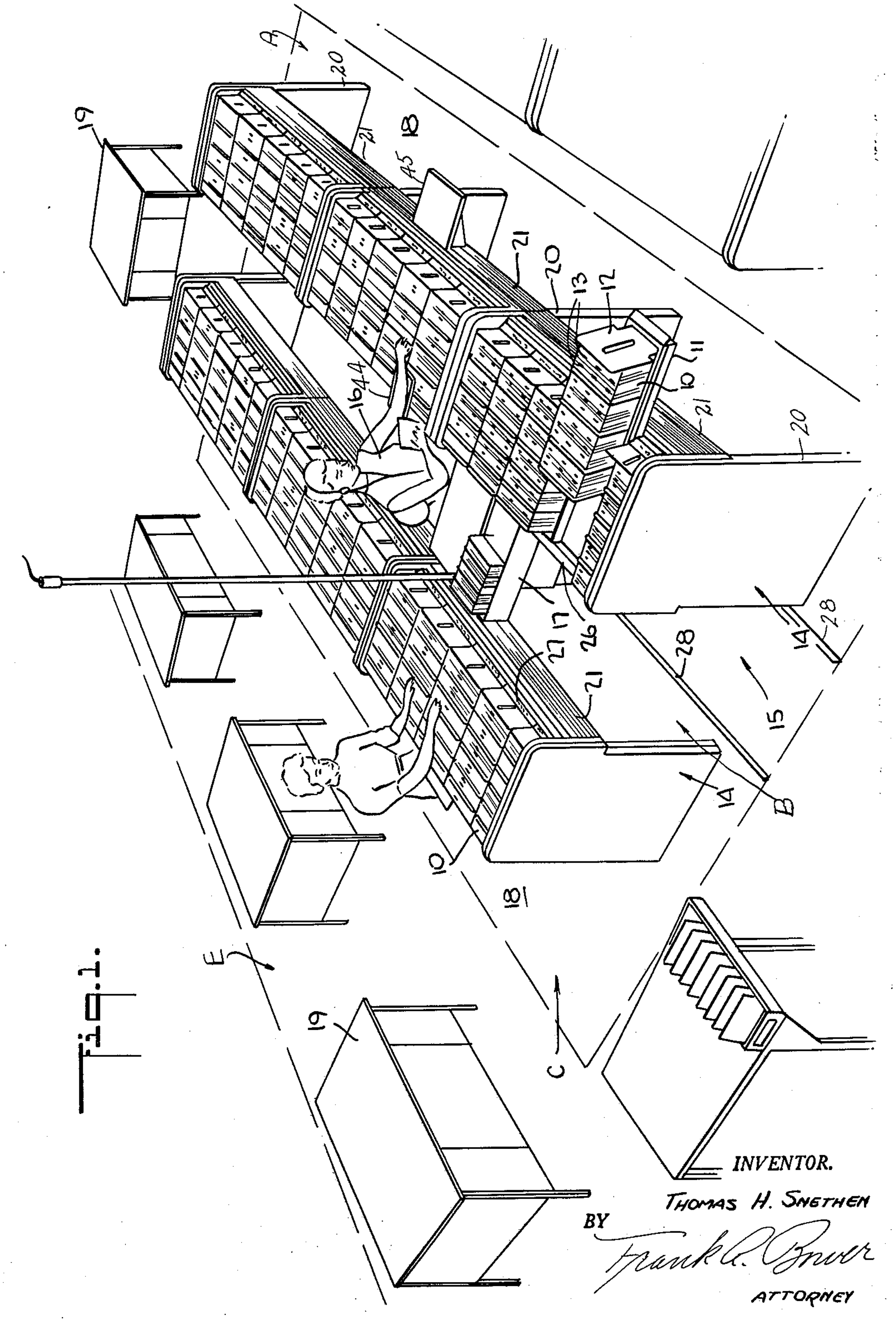

In FIG. 4 a different area relationship between the location of the unit files 37 and the work space for the area personnel is illustrated. For example, a general space G is divided into a central space F and unit filing areas C peripherally arranged around the central space F. The area personnel are located at desks 36 in the central space F. The unit files 37 are located in the unit filing areas C which are arranged peripherally to the area personnel in the central space F. The unit files are positioned in space C in the same manner as the unit files of FIG. 1. Each unit file comprises two file cabinets 14 extending parallel with a center aisle B for the unit operator. The records 10 are placed in trays 11. Space is provided on each side of the unit files for the area personnel to approach the cabinets and examine the records. The trays 11 may be removed from cabinets by the area personnel from this space in a similar manner to the unit files shown in FIG. 1.

Two or three unit files may be located in each leg of the space G. The unit files of adjacent legs may overlap or the corners may be unoccupied as illustrated in FIG. 4. The unit files in a leg are preferably aligned and rails 38 are provided to connect the aligned unit files so that a unit operator may move from one file unit to another in the same leg. Thus the same flexibility between aligned file units is obtained as in the embodiment of FIG. 1.

In the arrangement of FIG. 4 the area personnel may approach the unit files directly from the central space F or walk between the unit files and approach the cabinets from the outer side. The aisles or spaces A are provided on both sides of the unit files. Thus the cabinets of the unit files function as record holding units and as means for separating personnel performing separate filing operations on the records. The unit operator performing the regular and continuous duties is unmolested by other personnel performing intermittent filing duties in connection with the records.

Other arrangements are possible in which the work space of the area personnel is separated from the work space of the unit file. The area personnel approach the unit files from the exterior side or the side of the cabinets opposite from the unit operator.

The unit files illustrated in FIGS. 1–4 may have at the end of each cabinet a multi-drawer file 40 as illustrated in FIG. 5. The side of the file 40 is against the end of the cabinet 14 and the drawers 41 extend from either end of the file. The inactive records are stored in this file and are readily available to the unit operator either from the movable desk or from a standing position. The drawers 41 may be drawn into the aisle 15 or drawn into the aisle 18 by the cabinet to permit the drawers to be extended. Thus the inactive records are readily available either to the unit operator or the area personnel without interference with one another.

Figures 2, 3:
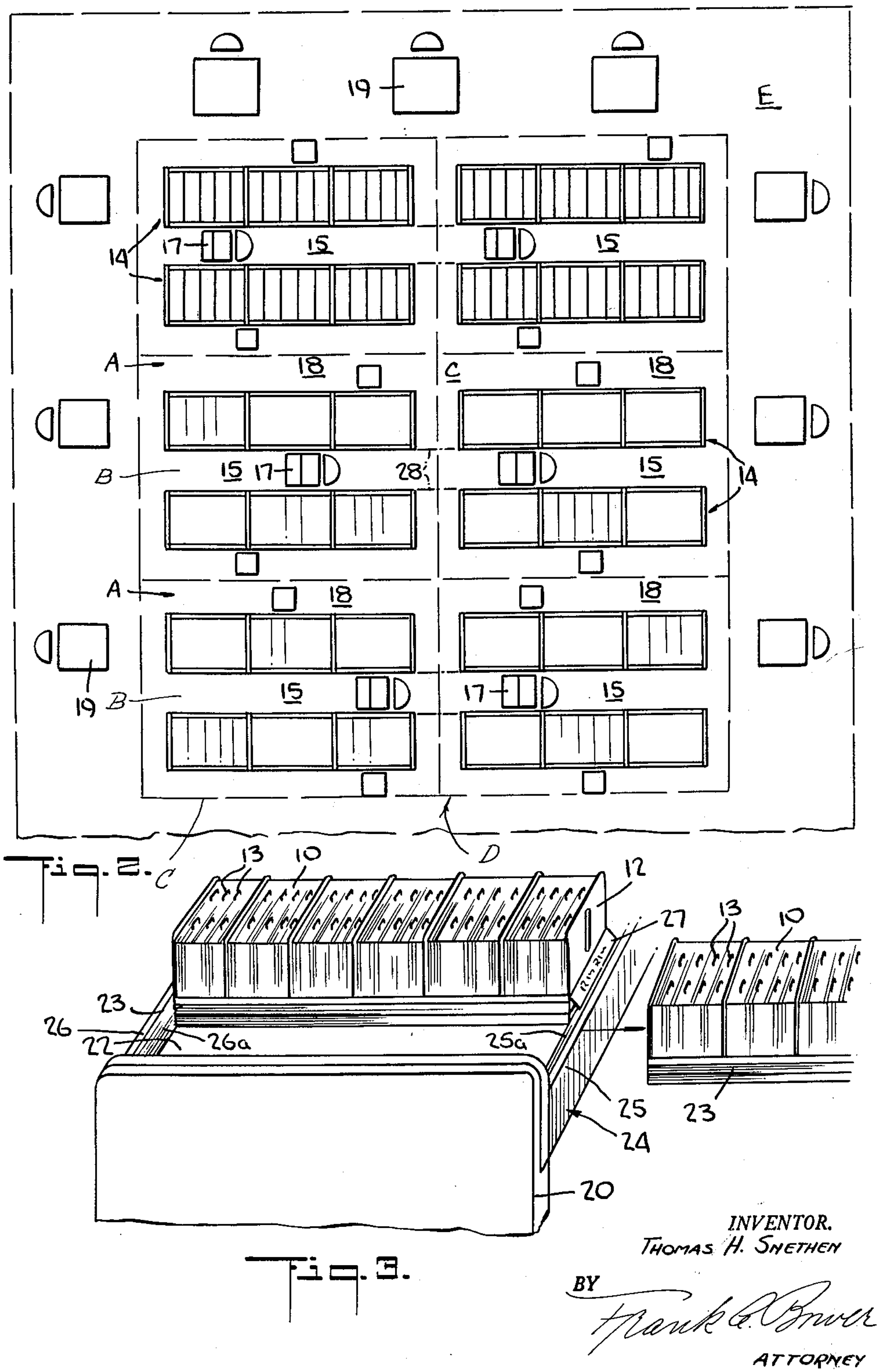
FIG. 2 is a diagrammatic view of the relation of the central area and the peripheral area.
FIG. 3 is a fragmentary view of a file tray and related unit.

In the arrangements of FIGS. 2–4 the multi-drawer files may be placed at either end. For example in FIG. 1 the files 40 could be placed at the near end of the cabinets 14. Sufficient space is provided in the arrangement of FIG. 1 along the center aisle to permit easy passage of personnel around the file unit.

The cabinet of the file units presents a neat, efficient appearance at all times and the files are easily manipulated. An arm rest 44 may be movably mounted on the side of the cabinet for the unit operator.

A movable shelf 45 is slideably mounted on the work aisle side of cabinets for resting records and the like.

Further the unit files have all of the files on the same level at a convenient working level. The file trays remain within the unit file and are only removed for periodic processing. With the files at a working level the central area is unobstructed and viewed at all locations from the area.

The foregoing apparatus is particularly adaptable to cycle billing systems for billing customers on their charge accounts. In cycle billing the charges made by a customer are filed by the unit operator with the customer's card record. Thus during the month as charges are being incurred the entries in the individual accounts are being added.

The accounts are not all billed at the same time during the month but are divided into groups and the groups billed separately at separate times during the month. In addition to making entries and billing the customers the records must be consulted for many purposes such as dunning delinquent accounts, answering customer inquiries and reviewing the accounts. These latter functions are performed by service personnel. The service personnel may be assigned to a number of unit files and are not continuously located at a unit file. Since these functions are different from the continuous notations by the unit operator but are required on the same records, the service personnel approach the records from the opposite side of the cabinets thereby eliminating interference, increasing the efficiency and number of records maintained and decreasing the floor area required. Further all of the records are visible at all times. This saves time by having immediate access to files without moving other files.

Various modifications may be made in the units without departing from the invention as set forth in the appended claims.

I claim:

1. Apparatus for filing and utilizing a large number of records continuously available for reference by a number of clerical personnel comprising two rows of filing cabinets extending longitudinally side by side and spaced by a work path for forming a unit file, work aisles extending parallel to said cabinets on the sides opposite to said work path, each of said cabinets having sides and ends defining a file space, trays on said cabinets in said file spaces extending transverse to said work path in side by side relation to support files extending longitudinal to and facing said work path to permit viewing transversely to said cabinets from said work path and work aisles, said cabinets each having an opening extending over said trays and downward to overlap said trays to form along and in each side of said cabinets side entrances for a lateral approach from either side into the file space for manipulation from the work path and the work aisles on the sides opposite to said work paths and for removal and return of files without interference with filing operations performed from the work path.

2. Apparatus as set forth in claim 1 wherein said unit files are positioned in an aligned relation in a work space and said work space is contiguous to a servicing area for personnel having an intermittent relation with a particular unit file.

3. Apparatus as set forth in claim 1 wherein a central area and a service area are provided with the service area extending around the central area and the central area having a plurality of unit files and the service area having clerical equipment for handling files removed from the unit files.

4. Apparatus as set forth in claim 2 wherein the work aisles of adjacent unit files are common.

5. Apparatus for filing and utilizing a large number of records continuously available for reference by a number of clerical personnel comprising a plurality of filing cabinets with a plurality of record holding trays extending in side by side relation transversely to said cabinets in a given horizontal level and with an open top extending below the top surface of the trays forming an unobstructed work space for rendering records accessible from either side of said cabinets, said cabinets aligned in two separate rows spaced by a work path for movement of an operator longitudinally between said files and in close proximity thereto, work aisles extending longitudinally on the other side for access to the trays by other personnel, said trays extending transversely to said work path and said work aisles and positioned in side by side relation to support records in transversely extending stacks, and each cabinet having first side panels on the work aisle side permitting removal of said trays and second side panels on the work path side preventing movement into said work path to render the records available for handling from either side without interference of the operating personnel.

6. Apparatus for filing and utilizing a large number of records continuously available for reference by a number of clerical personnel comprising a plurality of filing trays with a length substantially greater than the width and having side walls for supporting records, a plurality of filing cabinets each having a horizontal shelf for supporting said trays in side by side relation and having an edge member extending along one side normal to said shelf and laterally to said trays to block in one direction a shelf-engaging sliding movement of said trays off of said shelf, said edge member having a height less than the height of the side walls of said tray to permit access into the space over said shelf from the blocking side of the cabinet and said shelf having the opposite edge open for the sliding of said trays away from said edge member for removal from the cabinet, each of said cabinets having a longitudinally extending opening above said shelf and down each side of the cabinet to overlap said side walls of the trays to form an unobstructed work space, said cabinets aligned in two separate rows spaced by a work path for movement of an operator longitudinally between said cabinets and in close proximity thereto with the trays extending transversely to said work path and the records supported therein facing the work path for lateral manipulation by an operator from the work path into the work space over the trays, said cabinets having the edge members adjacent to said work path for blocking the sliding movement of said trays into said work path, work aisles extending longitudinally on the other side of each row of cabinets for access to the trays by other personnel and removal from the filing cabinets without interference between the operating personnel.

References Cited in the file of this patent

UNITED STATES PATENTS

| | | |
|---|---|---|
| 1,450,086 | Johnson | Mar. 27, 1923 |
| 1,899,837 | Ulrich | Feb. 28, 1933 |
| 2,045,756 | Cone | June 30, 1936 |
| 2,174,260 | Foulkes | Sept. 26, 1939 |
| 2,274,908 | Murray | Mar. 3, 1942 |
| 2,412,219 | Hunter | Dec. 10, 1946 |
| 2,658,810 | Ellis | Nov. 10, 1953 |
| 2,872,048 | Cooper | Feb. 3, 1959 |
| 2,880,048 | Weston | Mar. 31, 1959 |